United States Patent [19]
Gross et al.

[11] Patent Number: 5,994,808
[45] Date of Patent: Nov. 30, 1999

[54] FIELD REPLACEABLE MOTOR OIL FILTER FOR A SUBMERGIBLE MOTOR

[75] Inventors: Edwin M. Gross; Paul M. Sawyer, both of Bartlesville, Okla.

[73] Assignee: Camco International, Inc., Houston, Tex.

[21] Appl. No.: 09/099,554

[22] Filed: Jun. 18, 1998

[51] Int. Cl.[6] ............................... H02K 5/12; F04B 17/00
[52] U.S. Cl. ........................... 310/87; 310/91; 417/423.1; 417/423.2; 417/423.5
[58] Field of Search .................................. 310/85, 86, 87, 310/89, 91, 67 R, 112; 417/273, 310, 462, 39, 182, 423.1, 423.13, 423.3, 368, 369, 423.5, 410.4; 210/106, 416.1, 416.5

[56] References Cited

U.S. PATENT DOCUMENTS

| | | | |
|---|---|---|---|
| 2,790,916 | 4/1957 | Hinman | 310/87 |
| 2,885,964 | 5/1959 | Lung | 417/273 |
| 3,770,635 | 11/1973 | Atendido et al. | 310/87 |
| 3,854,064 | 12/1974 | Dunbar | 310/87 |
| 4,496,866 | 1/1985 | Yamamoto et al. | 310/87 |
| 5,333,998 | 8/1994 | Yoshida et al. | 417/273 |
| 5,828,149 | 10/1998 | Parmeter et al. | 310/87 |

*Primary Examiner*—Nestor Ramirez
*Assistant Examiner*—Tran Nguyen
*Attorney, Agent, or Firm*—Fletcher, Yoder & Van Someren

[57] ABSTRACT

A submergible motor having a universal motor base facilitates replacement of an internal filter while in the field. The submergible motor is designed for use in production wells and includes a generally tubular housing with a shaft lying generally along the axis of the tubular housing. The housing includes a mounting structure to which a universal motor base may be selectively attached and removed. Within the universal motor base is a filter assembly attached by threaded fasteners to permit easy removal of the filter for servicing or replacement.

20 Claims, 3 Drawing Sheets

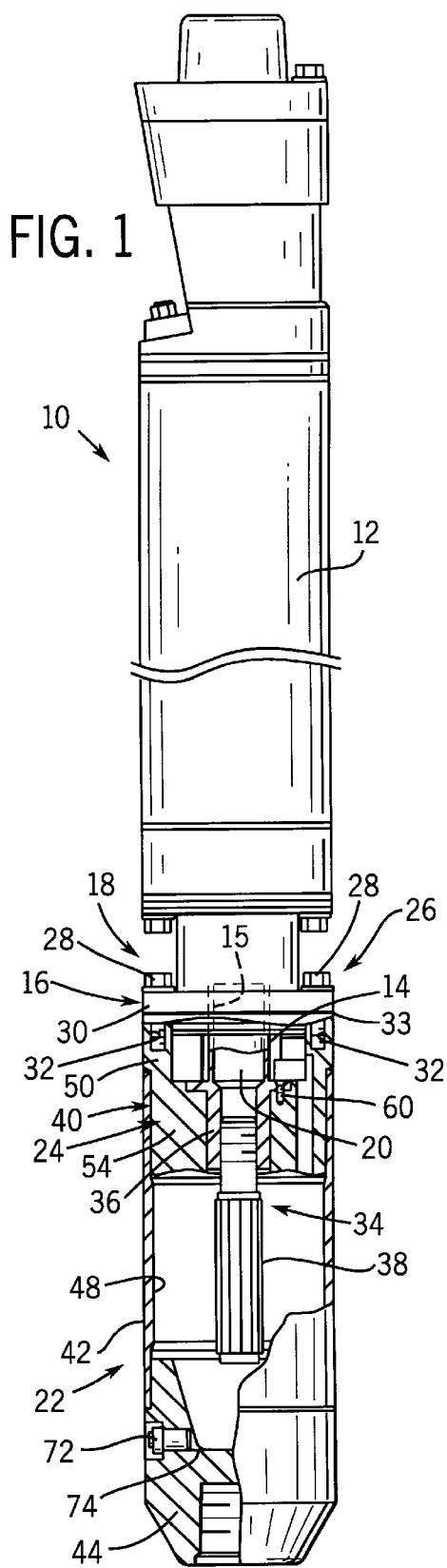
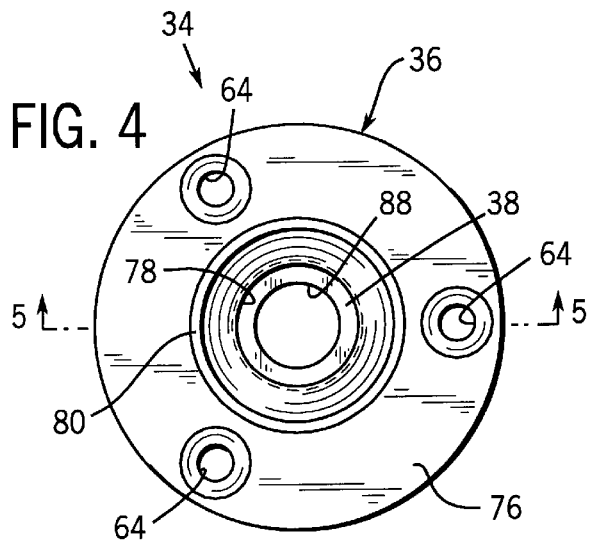
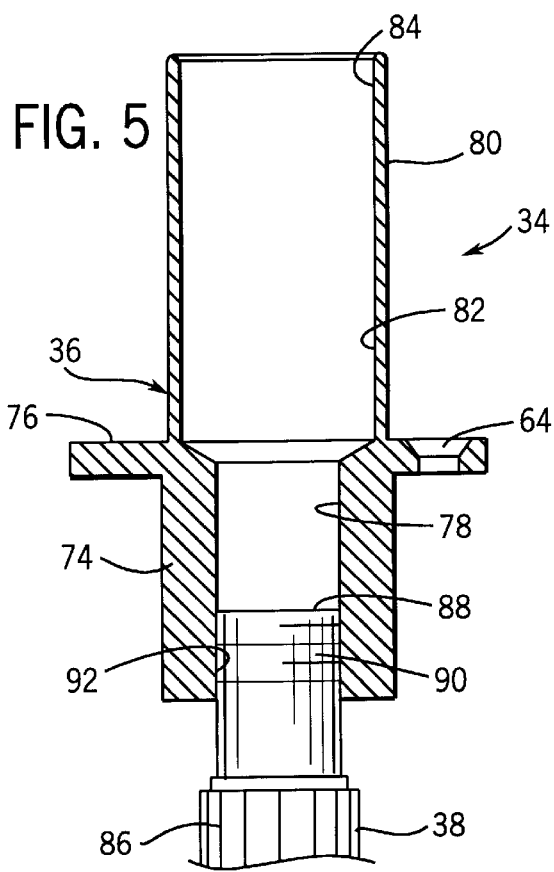

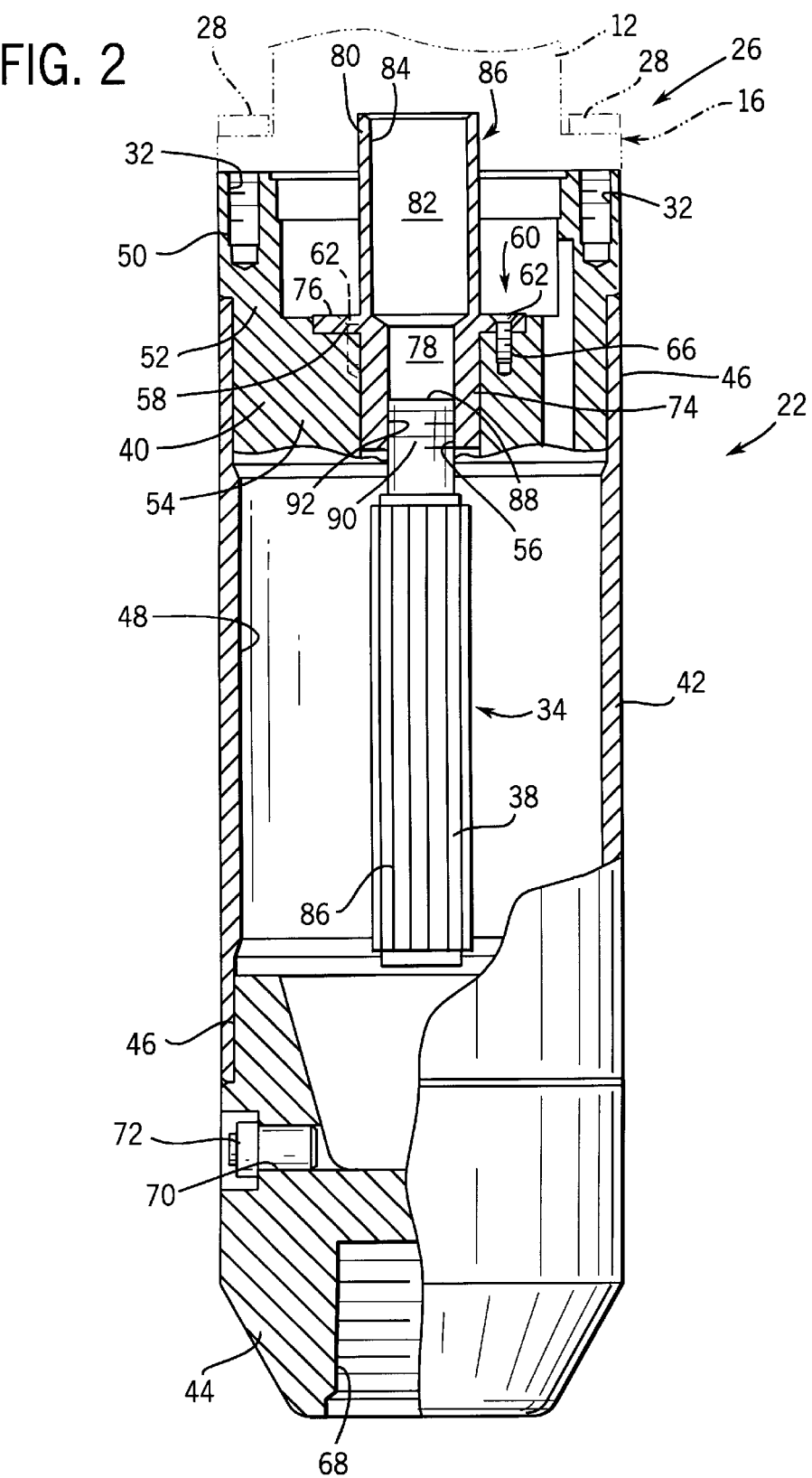

FIELD REPLACEABLE MOTOR OIL FILTER FOR A SUBMERGIBLE MOTOR

FIELD OF THE INVENTION

The present invention relates generally to submergible motors, such as those used in oil well applications, and particularly to a submergible motor having a lubricant filtration system that can be serviced readily in the field.

BACKGROUND OF THE INVENTION

Submergible motors are used in a variety of applications where power must be provided in a fluid environment. For example, submergible motors are used in submergible pumping systems utilized in pumping oil and/or other useful fluids from producing wells. In this application, the submergible motor, along with the rest of the submergible pumping system, is inserted into a wellbore and lowered until submerged in the desired oil and/or other fluids. The desired fluids collect in the wellbore and are raised to a point above the earth's surface via the submergible pumping system powered by the submergible motor.

A typical submergible motor, used to pump production fluids from beneath the earth's surface, has an outer housing substantially sealed from the production fluid environment and sized to fit within standard wellbore casings. An exemplary submergible motor is a three-phase induction-type motor having a shaft rotatably mounted within the housing such that it is in general alignment with the axis of the wellbore when residing in the wellbore.

Because of the environments in which such submergible motors are used and the often substantial thrust exerted by these motors, a liquid lubricant, such as mineral oil, is circulated internally. The internal lubricant serves to lubricate the bearings in which the shaft is mounted. It also assists in conducting motor generated heat to the motor housing, and ultimately, to the production fluids in which the motor is submerged.

The lubricating fluid often is contained in a reservoir at the base of the motor, from where it is pumped to the bearings and other components requiring lubrication. In a typical system, the shaft has an axial bore exposed to the fluid in the reservoir as well as cross-drilled bores at each of the bearings and other components requiring lubrication. As the shaft spins, a pumping action is established that moves the liquid lubricant up the axial bore and through the transverse openings to the components requiring lubrication. A filter is disposed either above the reservoir or in the reservoir and interrupts the path of lubricant flow to filter grit or other particles that may cause abrasion and wear if permitted to contact the bearings or other lubricated components.

In existing submergible motors, the filter is not serviceable in the field. Periodically, the submergible motor, along with the rest of the submergible pumping system, must be removed from the well for servicing. The submergible motor is disconnected from the remainder of the submergible pumping system and shipped back to the factory or a servicing location. The motor is then disassembled so that the filter can be cleaned or replaced. Disassembly of conventional motors, sometimes requires the breaking or removal of weldments, making servicing of the filter difficult in a field environment. Of course, the cost and delay associated with shipping motors to a servicing center are undesirable.

It would be advantageous to have a submergible motor that could be disassembled and reassembled in the field, at least to the extent permitting removal and replacement of the internal filter.

SUMMARY OF THE INVENTION

The present invention features a submergible motor designed for use while submerged in a liquid environment. The submergible motor includes an outer housing having a mounting structure to which a motor base may be connected. The submergible motor also includes a shaft rotatably mounted within the housing and having a shaft end extending through the mounting structure. The motor base is designed for selective connection to the mounting structure by a removable fastener. Within the motor base is an internal cavity of sufficient size to receive a filter. Additionally, a filter mount is removably connected to the motor base, and includes a channel therethrough that provides fluid communication between the internal cavity and the rotatable shaft. A filter may be connected to the filter mount to prevent the movement of undesirable particles from the lubricating fluid within the internal cavity to the rotatable shaft.

According to another aspect of the invention, a filter system is provided for use with a submergible motor. The motor has a longitudinal housing with a rotatable shaft mounted therein such that an end of the shaft extends through a mounting structure disposed at the longitudinal end of the housing. The filter system includes a motor base head constructed for removable attachment to the mounting structure. The motor base head is connected to one end of a motor base housing, and a motor base plug portion is connected to the other end of the motor base housing. The motor base head, motor base housing and motor base plug portion are arranged to form an internal cavity. A filter mount is removably attached to the motor base head proximate an opening through the motor base head. A filter may be attached to the filter mount.

According to another aspect of the invention, a filter system is provided for use with a submergible motor having a rotatable shaft that extends through a mounting structure. The filter system includes a universal base that may be removably attached to the mounting structure. The universal base has an internal cavity for holding a lubricant. A filter assembly is attachable to the universal base and designed to provide a fluid path from the internal cavity to a lower end of the rotatable shaft. The filter assembly is selectively attachable and removable from the universal base and the universal base is readily removable from the mounting structure to permit easy servicing of the filter while in a field environment.

BRIEF DESCRIPTION OF THE DRAWINGS

The invention will hereafter be described with reference to the accompanying drawings, wherein like reference numerals denote like elements, and:

FIG. 1 is a front view of a submergible motor, according to a preferred embodiment of the present invention, with a partial cutaway section through the universal motor base;

FIG. 2 is a cross-sectional view of the universal motor base illustrated in FIG. 1;

FIG. 4 is a top view of the filter mount assembly; and

FIG. 5 is a cross-sectional view taken generally along line 5—5 of FIG. 4.

DETAILED DESCRIPTION OF THE PREFERRED EMBODIMENT

Figure 3:
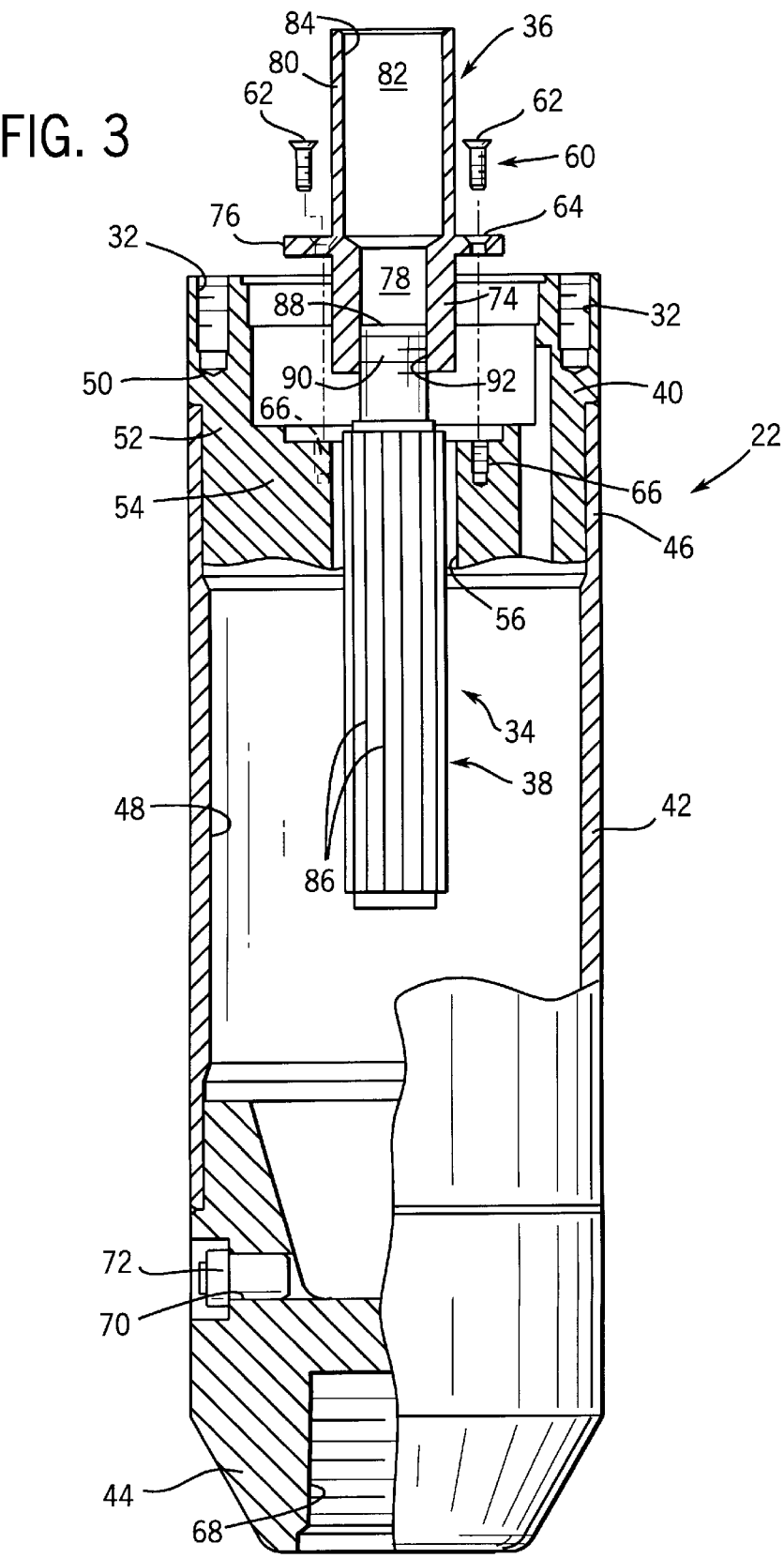
FIG. 3 is a cross-sectional view of the universal motor base illustrated in FIG. 2 but with the filter mount assembly partially removed.

Referring generally to FIG. 1, a submergible electric motor 10 is illustrated. In this particular embodiment, submergible motor 10 is of the type that may be combined with a submergible pumping system used in wellbores to pump production fluids to the surface. Submergible motor 10 typically is connected in series with other components, such as a modular protector, intake, pump, etc. prior to insertion into a wellbore. The submergible motor 10 is used to power components, such as the pump, to permit pumping of the production fluids to the surface or some point above the surface of the earth.

An exemplary submergible motor 10 is the 562 series motor manufactured by REDA, a Camco International company based in Bartlesville, Okla. The 562 series motor is a three-phase induction-type motor, but the present invention can be adapted to a wide variety of submergible motors of various sizes, diameters, and designs.

In the preferred embodiment, submergible motor 10 includes an outer housing 12 that often is generally cylindrical in shape. Mounted within outer housing 12 is a rotatable shaft 14 that typically lies generally along the longitudinal axis of outer housing 12, as best illustrated in FIG. 1. As is readily known by the those of ordinary skill in the art, the rotatable shafts used in submergible motors, such as rotatable shaft 14, usually include an axial bore 15 and cross-drilled holes (not shown) that cooperate to deliver lubricating oil or other lubricating fluid to the bearings in which the rotatable shaft 14 is mounted or to any other points requiring lubrication. This general style of submergible motor has been known and used, but existing submergible motors have not been amenable to service or replacement of the internal lubricating fluid filtration system while in the field. The present invention addresses these various drawbacks.

According to a preferred embodiment of the present invention, outer housing 12 includes a mounting structure 16 disposed at one of its longitudinal ends 18. Rotatable shaft 14 includes a shaft end 20 that extends through mounting structure 16.

Mounting structure 16 is designed for the selective attachment and removal of a filter system 22. Filter system 22 includes a universal base 24 that readily may be attached or detached from mounting structure 16 via a fastener 26. An exemplary fastener 26 comprises a plurality of threaded fasteners 28, such as bolts, that extend through a lower flange 30 of mounting structure 16 to be threadably received by corresponding threaded bores 32 disposed in universal base 24, as best illustrated in FIG. 1. A seal 33 is disposed between mounting structure 16 and universal base 24.

Filter system 22 also includes a filter assembly 34 attached to universal base 24 to provide a flow path for conducting lubricating fluid to axial bore 15 at shaft end 20 as well as to provide a filtration medium to remove particles and other impurities from the lubricating fluid. Filter assembly 34 comprises a filter mount 36 and a filter 38.

Filter system 22 can best be described with reference to FIGS. 2 and 3. Universal base 24 includes a motor base head 40, a motor base housing 42 and a motor base plug portion 44. Motor base head 40, motor base housing 42 and motor base plug portion 44 can be constructed as individual components or as various combinations of integral components. In the embodiment illustrated in FIGS. 2 and 3, the motor base head 40, motor base housing 42 and the motor base plug portion 44 are separate components securely fastened together at attachment regions 46 by threaded engagement, weldments, or a combination of threaded engagement and weldments.

In the preferred embodiment, motor base housing 42 is generally cylindrical having a hollow interior, and motor base head 40 and motor base plug portion 44 are attached to motor base housing 42 generally on opposing ends from one another. Thus, the combination of motor base head 40, motor base housing 42, and motor base plug portion 44 create an internal cavity 48 that acts as a reservoir for lubricating fluid.

In the illustrated embodiment, motor base head 40 generally includes a mounting region 50 that includes threaded bores 32 to permit easy attachment to and detachment from mounting structure 16. Motor base head 40 further includes a sidewall region 52 that extends from mounting region 50 into engagement with motor base housing 42 at one of the attachment regions 46. Motor base head 40 further includes a lateral wall 54 that provides a barrier between internal cavity 48 and shaft end 20 (see FIG. 1). Motor base head 40 also includes an opening 56 extending through lateral wall 54 to permit insertion and removal of filter 38 and filter mount 36.

A filter assembly attachment area 58 is disposed proximate opening 56 as illustrated best in FIG. 3. Preferably, filter assembly 34, and specifically filter mount 36, are connected to motor base head 40 at attachment area 58 by an appropriate fastener 60. Fastener 60 may comprise a wide variety of fasteners including threaded engagement of filter mount 36 with opening 56. In the illustrated embodiment, fastener 60 comprises a plurality of threaded fasteners 62, such as bolts, that extend through corresponding openings 64 in filter mount 36 and into corresponding threaded bores 66 disposed in lateral wall 54 of motor base head 40.

In this particular embodiment, filter assembly 34 is removably attached to motor base head 40 such that filter 38 extends into internal cavity 48, as illustrated best in FIG. 2. After removal of universal base 24 from mounting structure 16, filter assembly 34 can be removed for servicing or replacement simply by removing threaded fasteners 62 and separating filter assembly 34 from universal base 24, as illustrated in FIG. 3.

Motor base plug portion 44 can be made in a variety of shapes and configurations. Often, plug portion 44 will include a connector area 68 that facilitates attachment to another component of a submergible pumping system, such as a down hole monitoring tool. Also, motor base plug portion 44 may include a drainage orifice 70 having an appropriate valve 72 to permit drainage of various contaminants, e.g., sand or other grit, from the lower portion of internal cavity 48.

Referring to FIGS. 4 and 5, a preferred embodiment of filter assembly 34 is illustrated. In this embodiment, filter mount 36 includes a lower unit 74 having an outside diameter sized to slide into opening 56 when filter assembly 34 is connected to universal base 24. Lower unit 74 also includes a flange 76 that is received by filter assembly attachment area 58 when attached. Flange 76 includes a plurality, e.g., three, of the openings 64 through which threaded fasteners 62 may be inserted to facilitate fastening of filter mount 36 to lateral wall 54 of motor base head 40. Lower unit 74, of filter mount 36, also includes a channel 78 that provides a fluid flow path from filter 38 and internal cavity 48 to the shaft end 20. In other words, when submergible electric motor 10 is running, lubricating fluid is moved from internal cavity 48 through filter 38 and into channel 78 from which it flows into the axial bore 15 of rotatable shaft 14 at shaft end 20 to provide appropriate lubrication throughout submergible motor 10.

Filter mount 36 further includes an upper unit 80 that extends from flange 76 in a direction opposite the remainder of lower unit 74, as illustrated best in FIG. 5. Upper unit 80 includes an open interior or channel 82 that extends from channel 78 to an open end 84. Open end 84 and open interior 82 are sized to rotatably receive shaft end 20. Thus, channel 78 in cooperation with open interior 82 provide a complete fluid flow path from internal cavity 48 to rotatable shaft 14 (see FIG. 1).

Filter 38 may be made in many shapes and configurations utilizing a variety of materials. However, in the preferred embodiment, filter 38 is an enclosed hollow filter having an outer wall comprising a wire mesh material 86. Filter 38 further includes an open exit 88 at a connector end 90. Connector end 90 is designed to permit connection of filter 38 with filter mount 36 proximate channel 78, as illustrated in FIG. 5. Preferably, connector end 90 is threaded for engagement with a threaded segment 92 within channel 78 of lower unit 74. In operation, lubricating fluid moves from internal cavity 48 through wire mesh material 86 and into the interior of filter 38. From there, the lubricating fluid moves through channel 78, into open interior 82, and into the conventional axial bore 15 of a conventional rotatable shaft 14. However, the unique ability to attach and remove universal base 24 from mounting structure 16 combined with the ability to readily attach and remove filter assembly 34 from universal base 24 renders easy servicing and/or replacement of filter 38 in the field.

It will be understood that the foregoing description is of a preferred exemplary embodiment of this invention, and that the invention is not limited to the specific form shown. For example, a variety of filter materials and constructions can be used, different fastening mechanisms may be implemented, various regions of the universal base can be constructed as individual components or as overall unitary components, and the inventive filtration system can be designed for use with a wide variety of submergible motors. These and other modifications may be made in the design and arrangement of the elements without departing from the scope of the invention as expressed in the appended claims.

What is claimed is:

1. A submergible motor that can be used while submerged in a liquid environment, comprising:
    an outer housing having a mounting structure disposed at an end of the housing;
    a shaft rotatably mounted in the housing and having a shaft end extending through the mounting structure;
    a universal motor base selectively connectable to the mounting structure by a removable fastener, the motor base having an internal cavity; and
    a filter mount removably connected to the motor base, wherein the filter mount has a channel therethrough, the channel being exposed to the internal cavity and sized to rotatably receive the shaft end.

2. The submergible motor as recited in claim 1, further comprising a filter connected to the filter mount and substantially disposed in the internal cavity such that the filter is able to filter particulates from a liquid lubricant passing from the internal cavity to the channel.

3. The submergible motor as recited in claim 2, wherein the filter includes a connector region that is threadably engaged with the filter mount.

4. The submergible motor as recited in claim 2, wherein the filter comprises a wire mesh material.

5. The submergible motor as recited in claim 1, wherein the removable fastener comprises a plurality of threaded fasteners.

6. The submergible motor as recited in claim 5, further comprising a seal disposed between the mounting structure and the motor base.

7. The submergible motor as recited in claim 1, wherein the filter mount is removably connected to the motor base by a plurality of threaded fasteners.

8. A filter system for use with a submergible motor of the type having a rotatable shaft within a housing having a mounting structure, comprising:
    a motor base head constructed for removable attachment to the mounting structure, the motor base head having an opening therethrough;
    a motor base housing connected to the motor base head;
    a motor base plug portion connected to the motor base housing such that an internal cavity is formed within the motor base housing between the motor base head and the motor base plug portion; and
    a filter mount removably connected to the motor base head proximate the opening.

9. The filter system as recited in claim 8, wherein the filter mount is at least partially disposed in the opening, the filter mount having a channel therethrough that is in fluid communication with the internal cavity.

10. The filter system as recited in claim 9, wherein the channel is generally aligned with the shaft and sized to receive an end of the shaft.

11. The filter system as recited in claim 10, further comprising a filter connected to the filter mount and disposed in the fluid flow path from the internal cavity to the channel.

12. The filter system as recited in claim 11, wherein the filter includes a connector region that is threadably engaged with the filter mount.

13. The filter system as recited in claim 9, further comprising a plurality of fasteners to facilitate removable attachment of the filter mount to the motor base head.

14. The filter system as recited in claim 8, wherein the motor base head is removably attached to the mounting structure by a plurality of threaded fasteners.

15. A filter system for use with a submergible motor having a rotatable shaft with an end that extends through a mounting structure, comprising:
    a universal base that may be removably attached to the mounting structure, the universal base having an internal cavity for holding a lubricant; and
    a filter assembly that provides a fluid path from the internal cavity to the end of the rotatable shaft, wherein the filter assembly is selectively attachable and removable from the universal base.

16. The filter system as recited in claim 15, wherein the filter assembly comprises a filter mount and a filter.

17. The filter system as recited in claim 16, wherein the universal base includes a base head that separates the internal cavity from the end of the rotatable shaft, the base head having an opening therethrough to at least partially receive the filter mount.

18. The filter system as recited in claim 17, wherein the filter mount includes a channel therethrough to permit fluid flow from the filter to the end of the rotatable shaft, the channel being sized to rotatably receive the end.

19. The filter system as recited in claim 18, wherein the filter mount includes a flange having a plurality of openings spaced for alignment with a plurality of threaded openings in the motor base head such that a plurality of threaded fasteners may be used to facilitate attachment and removal of the filter assembly from the universal base.

20. The filter system as recited in claim 16, further comprising:
    a plurality of universal base fasteners that permit selective attachment and removal of the universal base with respect to the mounting structure; and
    a seal disposed between the universal base and the mounting structure.

* * * * *